United States Patent
Wang et al.

(10) Patent No.: US 8,830,895 B2
(45) Date of Patent: Sep. 9, 2014

(54) METHOD AND SYSTEM FOR ACQUIRING SERVICE LIST AND MULTIMEDIA BROADCAST MULTICAST SERVICE DATA

(75) Inventors: Bin Wang, Shenzhen (CN); Zijiang Ma, Shenzhen (CN); Hui Xu, Shenzhen (CN); Wei Gou, Shenzhen (CN)

(73) Assignee: ZTE Corporation, Hi-Tech Industrial Park, Nanshan District, Shenzhen, Guangdong Province (CN)

( * ) Notice: Subject to any disclaimer, the term of this patent is extended or adjusted under 35 U.S.C. 154(b) by 157 days.

(21) Appl. No.: 13/544,395

(22) Filed: Jul. 9, 2012

(65) Prior Publication Data

US 2013/0170421 A1    Jul. 4, 2013

(30) Foreign Application Priority Data

Jan. 26, 2010    (CN) .......................... 2010 1 0101325
Jan. 24, 2011    (WO) ................ PCT/CN2011/070545

(51) Int. Cl.
| | | |
|---|---|---|
| H04H 20/71 | (2008.01) | |
| H04W 48/08 | (2009.01) | |
| H04W 4/06 | (2009.01) | |

(52) U.S. Cl.
CPC ............... *H04W 4/06* (2013.01); *H04W 48/08* (2013.01)
USPC ...................... 370/312; 455/456.3

(58) Field of Classification Search
CPC ................. H04W 4/06; H04W 48/08

USPC ................. 370/312; 455/456, 456.3
See application file for complete search history.

(56) References Cited

U.S. PATENT DOCUMENTS

2009/0204997 A1*  8/2009  Xu et al. ......................... 725/54
2012/0009947 A1*  1/2012  Lee et al. ................... 455/456.3

FOREIGN PATENT DOCUMENTS

| CN | 101106797 A | 7/2006 |
|---|---|---|
| CN | 101312556 A | 12/2006 |
| WO | WO 2005/101681 A1 | 10/2005 |

* cited by examiner

*Primary Examiner* — Sai-Ming Chan
(74) *Attorney, Agent, or Firm* — Husch Blackwell LLP

(57) ABSTRACT

The present invention discloses a method for obtaining a service list and multimedia broadcast multicast service data, and the method includes: obtaining electronic service guide (ESG) information, receiving a system information block (SIB)13 from system information, and obtaining a cell service list according to the ESG information and the SIB 13. The present invention also discloses a system for obtaining a service list and multimedia broadcast multicast service data; in the system, a cell service list acquisition unit is configured to obtain ESG information, receive an SIB 13 from system information, and obtain a cell service list according to the ESG information and the SIB 13. With the method and system in the present invention, the cell service list can be acquired, and the receiving of data of multimedia broadcast multicast service (MBMS) service can be achieved after obtaining the cell service list.

19 Claims, 6 Drawing Sheets

ESG information

| | |
|---|---|
| MBMS service 1 ◄──► | MBSFN Area ID #a |
| MBMS service 2 | MBSFN Area ID #b |
| MBMS service 3 | MBSFN Area ID #c |
| MBMS service 4 | MBSFN Area ID #a |
| MBMS service 5 | MBSFN Area ID #c |
| MBMS service 6 | MBSFN Area ID #c |
| MBMS service 7 | MBSFN Area ID #a |
| MBMS service 8 | MBSFN Area ID #b |
| MBMS service 9 | MBSFN Area ID #c |
| MBMS service 10 | MBSFN Area ID #c |
| MBMS service 11 | MBSFN Area ID #b |
| MBMS service 12 | MBSFN Area ID #c |
| MBMS service 13 | MBSFN Area ID #a |
| MBMS service 14 | MBSFN Area ID #c |
| MBMS service 15 | MBSFN Area ID #a |

UE obtains SIB13 and acquires the corresponding MBSFN Area in the cell
(MBSFN Area ID)

⇒

Take
MBSFN Area ID #a
MBSFN Area ID #b
for example

Cell service list information

| | |
|---|---|
| MBMS service 1 ◄──► | MBSFN Area ID #a |
| MBMS service 2 | MBSFN Area ID #b |
| MBMS service 4 | MBSFN Area ID #a |
| MBMS service 7 | MBSFN Area ID #a |
| MBMS service 8 | MBSFN Area ID #b |
| MBMS service 11 | MBSFN Area ID #b |
| MBMS service 13 | MBSFN Area ID #a |
| MBMS service 15 | MBSFN Area ID #a |

FIG. 7

METHOD AND SYSTEM FOR ACQUIRING SERVICE LIST AND MULTIMEDIA BROADCAST MULTICAST SERVICE DATA

TECHNICAL FIELD

The present invention relates to a long term evolution (LTE) system, and particularly, to a method and system for obtaining a cell service list and receiving a multimedia broadcast multicast service (MBMS) service in a multimedia broadcast multicast service single frequency network (MB-SFN) area.

BACKGROUND OF THE RELATED ART

With the rapid development of Internet and the popularization of large-screen multi-functional mobile phones, a large number of mobile data multimedia services and various high bandwidth multimedia services appear, such as, video conference, TV broadcast, video on demand, video advertisement, network education, interactive game, and so on, which not only meet the increasing service requirements of the mobile user but also bring new service growth points to the mobile operators. These mobile data multimedia services require that a plurality of users are able to simultaneously receive the same data, and compared with common data services, the mobile data multimedia services have features of mass of data, long duration, and delay-sensitive, and so on.

In order to effectively use mobile network resources, the 3rd Generation Partnership Project (3GPP) proposes an MBMS service, and the MBMS service is a technology of transmitting data from a data source to a plurality of targets, which achieves resource sharing of networks including a core network and an access network and improves the utilization rate of the network resources, especially air interface resources. The MBMS service defined by 3GPP not only can achieve multicasting and broadcasting of message classes with plain text and low rate, but also can achieve broadcasting and multicasting of high speed multimedia services and provide various rich video, audio and multimedia services, which undoubtedly conforms to the development trend of future mobile data and provides a better service prospect for the development of 3rd Generation (3G) digital communication.

At present, the MBMS service is introduced into an LTE R9 system. Bearing the MBMS service in the system is required to achieve by the common transmission of a control signaling and user data. The control signaling notifies the terminal, for example, receives the corresponding control parameters of a terminal, a user equipment (UE), etc., and directs the terminal to receive its interested MBMS service (i.e., the corresponding user data) at a corresponding position. Such control signaling is transmitted via a multicast control channel (MCCH) in the LTE R9 system.

The MBMS services can be performed area division according to MBSFN areas (i.e., MBSFN Area), wherein, the MBSFN Area consists of a series of cells, and when a cell in the MBSFN Area sends the control signaling and the user data, it bears out synchronous sending by using a multimedia broadcast multicast service single frequency network (MB-SFN) technology, so that the UE can obtain the corresponding combination gain upon receiving. A certain particular area may be covered by a plurality of MBSFN Areas synchronously, which is the so-called MBSFN Area overlapping coverage, and that particular cell is a cell covered by a plurality of MBSFN Areas in an overlapping way. At present, the cell can support the overlapping coverage of 1 to 8 MBSFN Areas.

When there is an overlapping coverage situation in a certain cell, that cell may have a plurality of logic channels, MCCHs, simultaneously, that is because each MBSFN Area corresponds to one MCCH. However, for each MCCH, there is a modification period of the MCCH, and within the duration of the modification period of the MCCH, the contents bore by the MCCH are not allowed to be changed; and within the duration of the modification period of the MCCH, the MCCH information will also be sent repeatedly, wherein the time interval for sending is referred to as a repeat period of MCCH, and the repeated sending with the repeat period of MCCH is mainly for improving the reliability of the UE receiving the MCCH information.

The relationship between the modification period and the repeat period of the MCCH is shown in FIG. 1, wherein the modification period of the MCCH is represented as MCCH MP, the repeat period of the MCCH is represented as MCCH RP. In MCCH MP(n), the contents sent by the MCCH cannot be changed and can only be changed until the next MCCH MP, and the MCCH RP represents the repeated sending of the content of the MCCH in the MCCH MP. The UE can acquire all the MCCHs and its corresponding configuration information in the cell through a system information block (SIB) of a broadcast control channel (BCCH) and in particular through the SIB 13, such as corresponding parameters of how may MCCHs in that cell, the modification period of each MCCH, the repeat period of each MCCH, etc.

There is a one-to-one correspondence between the MCCH and the MBSFN Area; and the UE can acquire the control information about the MBSFN Area corresponding to the logic channel MCCH by receiving an MCCH message bore on the logic channel MCCH, for example, the configuration information about multicast subframe resources of that MBSFN Area, all the MBMS services which has completed MBMS Session Start procedure in that MBSFN Area, control parameters of those MBMS services which has completed MBMS Session Start procedure, and so on. The MBMS service with Session Start is the MBMS service which has already started sending by a network, and the control parameters of the MBMS service which has completed MBMS Session Start procedure include parameters such as MBMS-SessionInfo-r9, sessionId-r9, serviceId-r9, etc.

The features of the MBMS service is as follows: data amount of the service is large, the receiving duration of the terminal is long, and the average data rate is relatively constant. The above features decide that both scheduling of the MBMS service and the configuration of the control signaling are semi-static, that is, the scheduling information about the MBMS service and the control signaling information remain unchanged for long term. Thus, the MCCH information sent by the system all the time may be information which is not changed for a long time. Thus, for a terminal which has already obtained the MCCH information, if it receives every time the MCCH information which is not changed, the terminal will waste electricity, that is because the information amount of the MCCH is large, and a receiving and parsing process is relatively power consumptive. The "long term" regarding the control signaling information remains unchanged for long term generally refers to the time length of several seconds or several minutes; and the "sending all the time" regarding the MCCH information which is sent by the system all the time is in that a new user may access at any time.

Therefore, the introduction of an MBMS notification message is proposed. The MBMS notification message can describe with few information whether the MCCH information to be sent within the next MCCH modification period is updated as compared to the MCCH information sent within the current MCCH modification period. The UE only needs to monitor few information about the MBMS notification message, and the terminal then decides whether to receive the coming MCCH information according to the MBMS notification message. Aiming at the English description of the MBMS notification message, some companies call it as MCCH change notification, or MCCH notification, or MBMS notification Indicator, or MBMS notification information, or MBMS notification, and aiming at the Chinese description of the MBMS notification message, some companies call it as MBMS notification message, or MBMS notification information, or MBMS indication information, etc.; and in the subsequent description hereinafter, it is uniformly referred to as MBMS notification message in Chinese and MCCH notification in English for describing.

The specific sending position of the MBMS notification message (MCCH notification) is notified by the SIB 13 in the broadcast control channel (BCCH); and the MCCH notification is sent for several times within the modification period of the MCCH, or can also be once, and the specific position information and information about the number of times for sending are included in the SIB 13, as shown in FIG. 2.

When there is the overlapping coverage situation in the cell, for all the MCCHs in the cell a uniform MCCH notification is used to indicate a change situation of a plurality of MCCHs, which is specifically that:

the MCCH notification will indicate which one MCCH is changed or which MCCHs are changed through payload of the MCCH notification, wherein the payload of the MCCH notification is 8 bits and correspondingly supports the indication of the information about 8 MCCHs at most, and wherein it is notified that which bit in the payload of the specific MCCH notification represents the information about which MCCH by the system information block SIB13 in the BCCH. In order to describe the process of MCCH notification more clearly, a specific example is taken as follows. As shown in FIG. 3, the UE acquires that the $3^{rd}$ bit in the payload of the MCCH notification represents MBSFN Area1 by the SIB13, and taking the relation of one-to-one correspondence between the MBSFN Area and the MCCH into consideration, therefore the $3^{rd}$ bit in the payload of the MCCH notification will represent whether the MCCH1 information is changed; if the UE monitoring the MCCH notification finds that the $3^{rd}$ bit is "1", it indicates that its corresponding MCCH1 information has changed, and if the UE monitoring the MCCH notification finds that the $3^{rd}$ bit is "0", it indicates that its corresponding MCCH1 information has not changed; of course, the meanings represented by "1" and "0" can be interchanged, that is, "1" represents that the corresponding MCCH1 information has changed, and "0" represents that the corresponding MCCH1 information has not changed. Thus, the UE can realize to monitor whether the corresponding MCCH1 information has changed by monitoring the MCCH notification.

Further, according to the above contents, a certain bit in the payload of the MCCH notification corresponds to whether the corresponding MCCH information is changed, for example, "1" represents that it is changed, and "0" represents that it is not changed. However, the corresponding bit in the payload of the MCCH notification will not indicate that any MCCH information is changed. At present, the MCCH notification only indicates the change of the MCCH information triggered by the Session Start of the MBMS service, but other change reasons of the MCCH message, such as Session Stop, Session Update, will not trigger the indication of the payload of the MCCH notification. For example, the MCCH information is changed due to Session Stop or Session Update, the corresponding bit of the payload of the MCCH notification will not indicate that the MCCH information is changed, so that the UE monitoring the MCCH notification also cannot acquire that the corresponding MCCH information has changed. In summary, the current MCCH notification can only reflect the Session Start of the MBMS service and the Session Start of the MBMS(s) of which MBSFN Area(s) has happened; that is to say, the change of these three types of information in the MCCH message will not be embodied in the MCCH Notification: 1) the configuration information about the MCCH is changed, for example, the configuration information of the MBSFN subframe of an MBSFN area is changed; 2) Session Update and Session Stop of the MBMS service; and 3) Session Start of which specific MBMS service occurs.

In conclusion, various related arts involving MBMS services above neither reveals an implementation of how to obtain a cell service list nor an implementation of how to receive the MBMS service data after obtaining the cell service list.

CONTENT OF THE INVENTION

In view of this, the main purpose of the present invention is to provide a method and system for obtaining a service list and data of an MBMS service, which can obtain a cell service list and receive the data of the MBMS service after obtaining the cell service list.

In order to achieve the above purpose, the technical solution of the present invention is implemented as follows.

A method for obtaining a service list and multimedia broadcast multicast service data comprises: obtaining electronic service guide (ESG) information, receiving a system information block (SIB)13 from system information, and obtaining a cell service list according to the ESG information and the SIB13.

When a user equipment (UE) obtains the ESG information, an acquisition opportunity of the ESG information comprises: when the UE powers on, or when the UE is registering to a network, or before the UE enters a current multimedia broadcast multicast service single frequency network (MBSFN) area, or before the UE enters another MBSFN area besides the current MBSFN area.

The ESG information comprises at least one of the following information:

all multimedia broadcast multicast service (MBMS) services bore in a network; and information about the MBSFN Area corresponding to each MBMS service.

There is a one-to-one correspondence relation between each MBMS service and the MBSFN Area.

The information about the MBSFN Area at least comprises: MBSFN Area identity (ID), and the MBSFN Area ID is one-to-one correspondence to an MBMS service ID; wherein, each MBSFN Area is identified by the corresponding MBSFN Area ID, and each MBMS service is identified by the corresponding MBMS service ID; and obtaining the cell service list according to the ESG information and the SIB13 comprises: the UE acquiring the information about one or more MBSFN Areas of a cell to which the UE belongs by the SIB13, obtaining one or more MBSFN Area IDs from the information about one or more MBSFN Areas, selecting a part of or all of the MBMS services from the MBMS services obtained by the ESG information, composing the cell service list using the selected MBMS services, so as to achieve the acquisition of the cell service list; wherein, the selecting comprises: being achieved by matching according to the one-to-one correspondence relation between the MBMS service ID and the MBSFN Area ID in the ESG information and the MBSFN Area ID obtained from the SIB13.

In this case, after obtaining the cell service list, further comprising: the UE selecting an MBMS service in which the UE is interested from the cell service list; the UE obtaining control information related to the MBMS service in which the UE is interested; and the UE receiving data of the MBMS service in which the UE is interested according to the control information.

The selecting the MBMS service in which the UE is interested comprises:

the UE directly selecting the MBMS service in which the UE is interested from the cell service list;

or, after receiving the information about one or more corresponding multicast control channels (MCCH) through the information about one or more MBSFN Areas obtained from the SIB13, the UE selecting the MBMS service in which the UE is interested from the cell service list; wherein, for the information about one or more MCCHs and one or more MBSFN Areas, there is a one-to-one correspondence relation between the information about each MCCH and the MBSFN Area ID corresponding to each MBSFN Area.

The obtaining the control information related to the MBMS service in which the UE is interested comprises: the UE obtaining the information about the MCCH corresponding to the MBMS service in which the UE is interested according to the one-to-one correspondence relation between the information about the MCCH and the MBMS service ID; wherein, acquiring the one-to-one correspondence relation between the information about the MCCH and the MBMS service ID comprises: the UE acquiring the one-to-one correspondence relation between the information about the MCCH and the MBMS service ID according to the one-to-one correspondence relation between the information about each MCCH and the MBSFN Area ID and the one-to-one correspondence relation between each MBSFN Area ID and the MBMS service ID.

A system for obtaining a service list and multimedia broadcast multicast service data comprises: a cell service list acquisition unit, configured to obtain electronic service guide (ESG) information, receive a system information block (SIB) 13 from system information, and obtain a cell service list according to the ESG information and the SIB13.

The cell service list acquisition unit is further configured for the UE to acquire information about one or more multimedia broadcast multicast service single frequency network (MBSFN) Areas of a cell to which the UE belongs by the SIB13, obtain one or more MBSFN Area IDs from the information, select a part of or all of MBMS services from the MBMS services obtained by the ESG information, compose the cell service list using the selected MBMS services, so as to achieve the acquisition of the cell service list; wherein, the selecting comprises: being achieved by matching according to a one-to-one correspondence relation between an MBMS service ID and an MBSFN Area ID in the ESG information and an MBSFN Area ID obtained from the SIB13.

The system further comprises: an MBMS service selection unit, a control information acquisition unit and an MBMS service data acquisition unit; wherein, the MBMS service selection unit is configured for the UE to select an MBMS service in which the UE is interested from the cell service list;

the control information acquisition unit is configured for the UE to obtain control information related to the MBMS service in which the UE is interested; and the MBMS service data acquisition unit is configured for the UE to receive data of the MBMS service in which the UE is interested according to the control information.

The MBMS service selection unit is further configured for the UE to directly select the MBMS service in which the UE is interested from the cell service list, or for the UE to select the MBMS service in which the UE is interested from the cell service list after receiving information about one or more corresponding MCCHs by the information about one or more MBSFN Areas obtained from the SIB13; and wherein, for the information about one or more MCCHs and one or more MBSFN Areas, there is a one-to-one correspondence relation between the information about each MCCH and the MBSFN Area ID corresponding to each MBSFN Area.

The control information acquisition unit is further configured for the UE to obtain the information about the MCCH corresponding to the MBMS service in which the UE is interested according to the one-to-one correspondence relation between the information about the MCCH and the MBMS service ID; wherein, acquiring the one-to-one correspondence relation between the information about the MCCH and the MBMS service ID comprises: the UE acquiring the one-to-one correspondence relation between the information about the MCCH and the MBMS service ID according to the one-to-one correspondence relation between the information about each MCCH and the MBSFN Area ID and the one-to-one correspondence relation between each MBSFN Area ID and the MBMS service ID.

In the present invention, the electronic service guide (ESG) information is acquired, the SIB13 is received from the system information, and the cell service list is obtained according to the ESG information and the SIB13.

With the present invention, the cell service list can be acquired. Further, the receiving of the data of the MBMS service can be achieved by adopting the obtained cell service list.

BRIEF DESCRIPTION OF DRAWINGS

FIG. 7 is a schematic diagram of a UE obtaining cell service list information according to an example 1 of the present invention;

PREFERRED EMBODIMENTS OF THE PRESENT INVENTION

Figure 1:
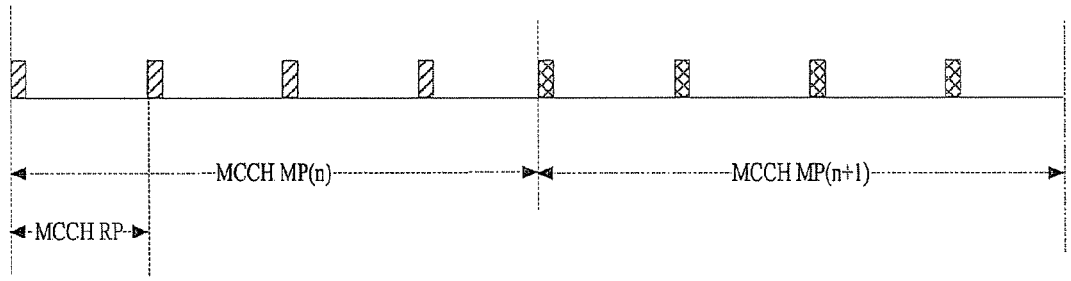
FIG. 1 is a diagram of a logic relation between a modification period and a repeat period of an existing MCCH.
Figure 2:
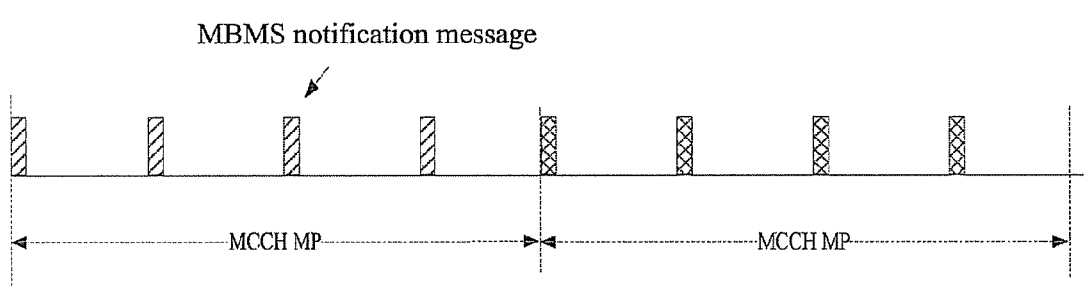
FIG. 2 is a diagram of a relation between a modification period of an existing MCCH and a sending position of an MCCH notification.
Figure 3:
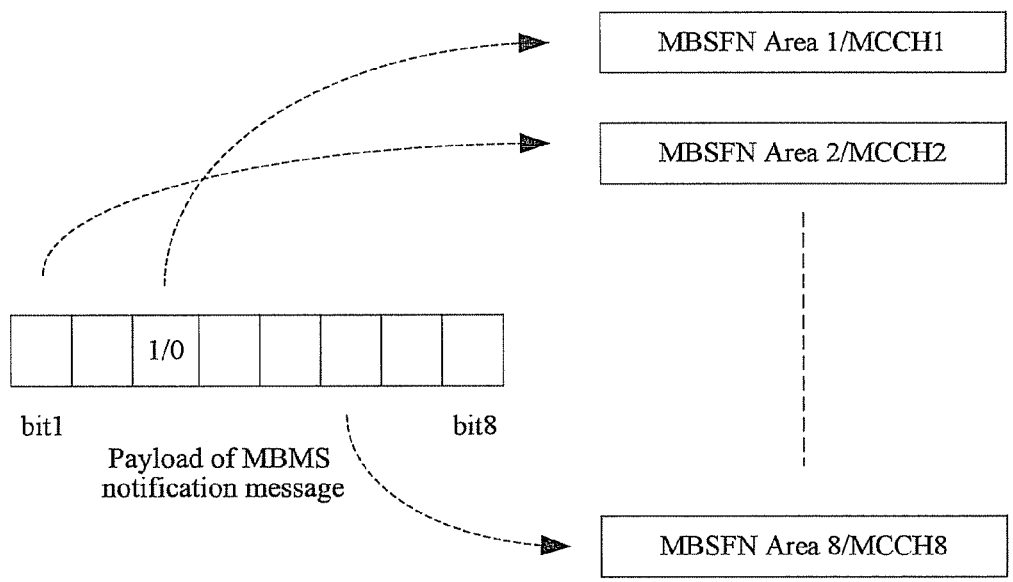
FIG. 3 is a diagram of a correspondence relation between payload of an existing MCCH notification and MBSFN Areas.

The basic idea of the present invention is: obtaining ESG information, receiving SIB13 from system information, and obtaining a cell service list according to the ESG information and the SIB13. Further, receiving of data of MBMS services can be achieved by adopting the obtained cell service list.

In the following, the implementation of the technical solution will be further described in detail in combination with the accompanying drawings.

The present invention is an implementation solution for obtaining a cell service list of a current cell and how to receive the data of the MBMS service after obtaining the cell service list. With the present invention, not only the cell service list can be acquired, but also the UE can correctly receive the data of the MBMS service of that cell.

The present invention mainly includes several aspects of contents as follows.

The first aspect: at first, the present invention, which is different from the related art, introduces how the UE obtains the cell service list information. The content description of this aspect is also an important point hereinafter. It will be described in detail in the following.

I. The UE obtains electronic service guide (ESG) information.

Here, the ESG information includes all the MBMS services which may be bore in a network. The UE can acquire all the MBMS services which may be bore in the network by obtaining that ESG information.

Further, the opportunity for the UE obtaining the ESG information can be: 1) when the UE powers on; 2) when the UE is registering to the network; 3) before the UE enters an MBSFN area; and 4) before the UE enters another MBSFN area.

Further, the way of the UE obtaining the ESG information can be at least one of the following ways:

1) the way of obtaining the ESG can be a short message service (SMS), a wireless application protocol (WAP), etc.;

2) the UE downloads to obtain the ESG information from a website;

3) the UE receives the ESG information sent to the UE by the network in the manner of point to point;

4) the UE receives the ESG information sent to the UE by the network in the manner of point to multi-point.

Further, after the UE obtains the ESG information, the UE will store the ESG information into a storage medium thereof.

It needs to be pointed out that, the ESG information includes at least one of the following information:

1) all the MBMS services which may be bore in the network;

the MBMS services here are: all the MBMS services which may be bore in the network; and the MBMS services may belong to the same MBSFN Area, and may also belong to a plurality of MBSFN Areas;

2) information about the MBSFN Area corresponding to each MBMS service;

that is to say, the ESG information at least further includes a one-to-one correspondence relation between each MBMS service and the MBSFN Area besides the MBMS services in 1).

Each MBMS service is identified with an MBMS service identity (ID) corresponding to each MBMS service; and each MBSFN Area is identified with an MBSFN Area ID corresponding to each MBSFN Area.

II. The UE receives the system broadcast information SIB13.

Here, specifically, the UE receives a system information block (SIB13) of the system broadcast information, and the UE will acquire information about one or more MBSFN Areas of a cell to which that UE belongs and scheduling information about an MCCH notification by the SIB13. By the scheduling information about the MCCH notification, the UE can acquire to receive the corresponding MCCH notification adopting what modulation and coding scheme (MCS) and at what time and frequency position. Wherein, the cell to which the UE belongs is: a cell where the UE is located at a geographical location; and the scheduling information about the MCCH notification refers to a time-frequency resource position and an MCS for sending the MCCH notification.

Figure 4:
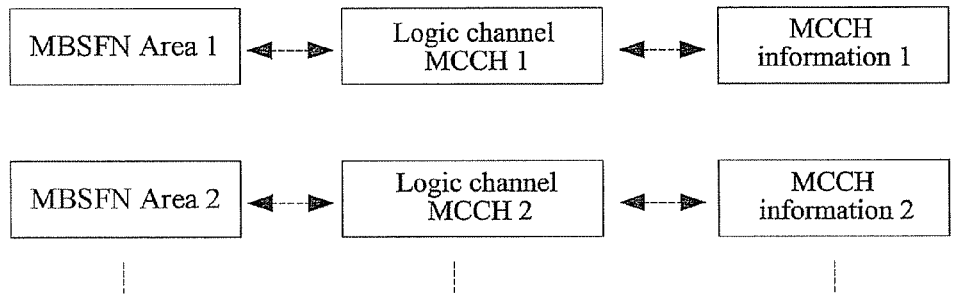
FIG. 4 is a diagram of correspondence relations between MBSFN Areas, logic channels MCCHs and information about an MCCH according to the present invention.

For the information about one or more MBSFN Areas, the information about one or more MBSFN Areas specifically includes: information such as the scheduling information about the logic channel MCCH corresponding to each MBSFN Area, MBSFN Area ID, etc. It can be seen that: there is a one-to-one correspondence relation between the MBSFN Area and the logic channel MCCH, and the logic channel MCCH is used for bearing the information about the MCCH, i.e., the logic channel MCCH has a one-to-one correspondence relation with the information about the MCCH; therefore, the MBSFN Area also has a one-to-one correspondence relation with the information about the MCCH, as shown in FIG. 4. Wherein, the scheduling information about the logic channel MCCH corresponding to each MBSFN Area includes the time and frequency position information and the MCS for sending the information about the MCCH; for the logic channel MCCH has the one-to-one correspondence with the information about the MCCH, for example, logic channel MCCH1 bears the information about MCCH1 and MCCH2 bears the information about MCCH2.

III. The cell service list information is obtained according to the ESG and the SIB13.

Here, after obtaining the SIB13 information by the second step described in the first aspect of contents, the UE will acquire the information about all the MBSFN Areas in the cell, that is, that cell is covered by which one MBSFN Area or which MBSFN Areas, and can acquire the MBSFN Area IDs of all the MBSFN Areas from the SIB13. The UE can acquire all the MBMS services bore by one or more MBSFN Areas in that cell by these MBSFN Area IDs in combination with the obtained ESG information.

Figure 5:
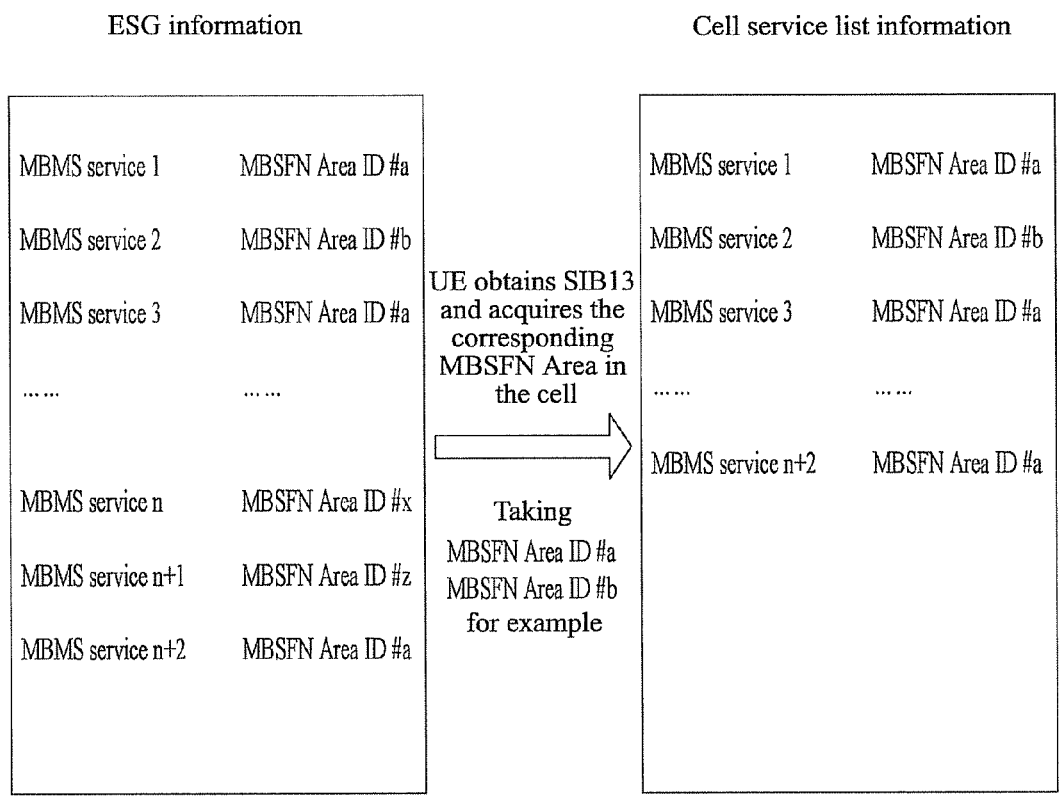
FIG. 5 is a schematic diagram of a UE obtaining cell service list information according to the present invention.

Specifically, the UE being able to acquire all the MBMS services bore by one or more MBSFN Areas in that cell mainly depends upon a one-to-one correspondence relation between each MBMS service and the MBSFN Area in the ESG, or which is referred to as a one-to-one correspondence relation between the MBMS service ID and the MBSFN Area ID; and the UE obtains the MBSFN Area ID information about the cell by the SIB13, so that the UE can acquire all the MBMS services bore by one or more MBSFN Areas in that cell, which is referred to as the cell service list, as shown in FIG. 5. Each MBMS service is identified with the MBMS service ID corresponding to each MBMS service; and each MBSFN Area is identified with the MBSFN Area ID corresponding to each MBSFN Area. It needs to be pointed out here that: the "ESG information" is equivalent to a complete set, including the one-to-one correspondence relation between each MBMS service and each MBSFN Area; and the "cell service list information" is equivalent to a subset of that complete set, and that subset ≤that complete set.

Second aspect, the UE selects a service in which the UE is interested from the cell service list information. The following two optional solutions can be included.

Optional solution 1: the UE receives the information about one or more corresponding MCCHs by the information about one or more MBSFN Areas obtained from the SIB13, that is, the UE receives the information about all the MCCHs in the cell according to the information about all the MBSFN Areas in that cell obtained from the SIB 13, and selects an interested MBMS service from the acquired cell service list.

Optional solution 2: herein, the UE may also not obtain any information but directly selects an interested MBMS service from the service list information.

Aiming at selecting the interested service, selecting the interested service refers to that the user selects any MBMS service from the cell service list by using the UE according to his/her interests.

Third aspect, after selecting the interested MBMS service, the UE obtains control information related to that MBMS service. The following two optional solutions can be included.

Optional solution 1: the UE receives the information about the MCCH related to the interested MBMS service according to the selected interested MBMS service; the logic channel MCCH related to that interested MBMS service is given by the ESG described in the first aspect of contents, and considering the one-to-one correspondence relation between the logic channel MCCH and the information about the MCCH, therefore, the UE can only receive the information about the MCCH related to the interested MBMS service. Specifically, the scheduling information about the logic channel MCCH related to the MBMS service in which the UE is interested is given by the obtained SIB13 described by the second aspect of contents.

Optional solution 2: in addition, the UE can also receive the information about all the MCCHs in the cell indicated by the SIB13 according to the interested MBMS service selected by the UE. That is to say, the optional solution 2 here is different from the solution of only receiving the information about the MCCH information related to the MBMS service in which the UE is interested by considering the one-to-one correspondence relation between the logic channel MCCH and the information about the MCCH in the above optional solution 1; the optional solution 2 is equivalent to a blind detection, which is to receive the information about all the MCCHs but not only receive the information about the MCCH related to the MBMS service in which the UE is interested.

In particular, if the UE has received the information about all the MCCHs in the cell which is described in the second aspect of contents, herein it still needs to receive the information about the MCCH again, which is because of taking the timeliness of the information about the MCCH into account to prevent the information about the MCCH from being invalid.

The fourth aspect, the UE receives the data of the interested MBMS service.

I. The UE judges whether its interested MBMS service completes the MBMS Session Start procedure according to the obtained information about the MCCH described in the third aspect of contents.

Specifically, the judging basis is that the UE judges whether that MBMS service is completes the MBMS Session Start procedure according to whether the obtained information about the MCCH includes the control parameters of the MBMS service in which that UE is interested, such as parameters of MBMS-SessionInfo-r9, sessionId-r9, serviceId-r9.

Further, if the control parameters of the MBMS service in which the UE is interested are included, then that MBMS service has already completed the MBMS Session Start procedure, i.e., it indicates that that MBMS service has been and is being sent via the network, and the MBMS service is in an ongoing state; and if the control parameters of the MBMS service in which the UE is interested are not included, then that MBMS service does not trigger the MBMS Session Start procedure, i.e., it indicates that the MBMS service has not been sent via the network currently.

II. The corresponding operation is performed according to different judgment results of which the UE judges that its interested MBMS service has completed the MBMS Session Start procedure or does not trigger the MBMS Session Start procedure.

In particular, if the UE judges that its interested MBMS service has completed the MBMS Session Start procedure, then the UE will receive the service data of the MBMS service by combining the control parameters of the interested MBMS service obtained from the MCCH, such as parameters of MBMS-SessionInfo-r9, sessionId-r9, serviceId-r9, so as to complete a receiving process of the service data of its interested MBMS service.

If the UE judges that its interested MBMS service does not trigger the MBMS Session Start procedure, the UE will monitor the MCCH notification; the UE can acquire whether the corresponding MCCH has changed by monitoring the MCCH notification, and if it has changed, then the corresponding information about the MCCH will be re-updated, until its interested MBMS service has completed the MBMS Session Start procedure.

The present invention will be described by examples hereinafter.

Figure 6:
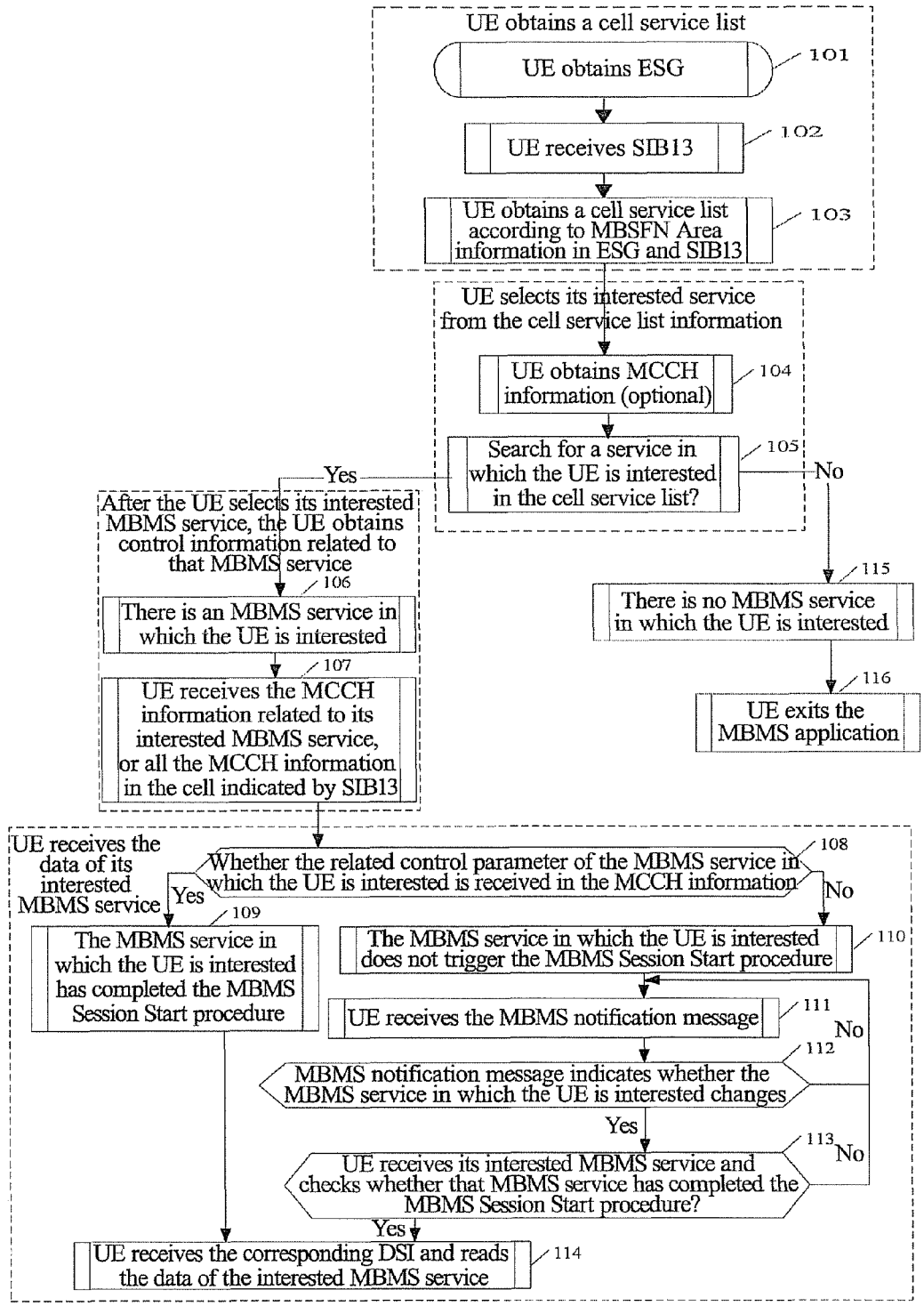
FIG. 6 is a flow chart of an implementation procedure of a method embodiment of the present invention.

Method embodiments: as shown in FIG. 6, the present embodiment is a complete flow of receiving data of the MBMS service after obtaining the cell service list introduced into the present invention, and the flow includes the following steps.

In step 101, the UE obtains the ESG.

In step 102, the UE receives the SIB13.

In step 103, the UE obtains the cell service list according to information about the MBSFN Area in the ESG and the SIB13.

In step 104, the UE obtains the information about the MCCH.

It needs to be pointed out here that: for the present invention, step 104 is optional, since the cell service list can be obtained by adopting the present invention, the data of the MBMS service can also be finally obtained without considering the information about the MCCH; however, for the related art, step 104 is necessary, and if the information about the MCCH is not taken into account, the data of the MBMS service cannot be obtained finally.

In step 105, an MBMS service in which the UE is interested is searched for in the cell service list, if yes, then step 106 is performed, otherwise, step 115 is turned to be performed.

In step 106, there is the MBMS service in which the UE is interested.

In step 107, the UE receives the information about the MCCH related to the MBMS service in which the UE is interested, or receives the information about all the MCCHs in the cell indicated by the SIB13.

It needs to be pointed out here: for the related art, it is ok in step 107 to only receive the information about the MCCH related to the interested MBMS service or receive the information about all the MCCHs in the cell indicated by the SIB13, and since the related art does not take the one-to-one correspondence relation between the logic channel MCCH and the information about the MCCH into account, the information about all the MCCHs can be received; however, for the present invention, the one-to-one correspondence relation between the logic channel MCCH and the information about the MCCH is taken into account, so the UE can only receive the information about the MCCH related to the interested MBMS service.

In step 108, it is judged whether the related control parameters of the MBMS service in which the UE is interested are received in the information about the MCCH, if yes, then step 109 is performed, otherwise, step 110 is turned to be performed.

In step 109, the MBMS service in which the UE is interested has completed the MBMS Session Start procedure, then step 114 is turned to be performed.

In step 110, the MBMS service in which the UE is interested does not trigger the MBMS Session Start procedure.

In step 111, the UE receives the MEWS notification message.

In step 112, the MBMS notification message indicates whether the MBMS service in which the UE is interested has changed, if yes, then step 113 is performed, otherwise, step 111 is turned to be performed.

In step 113, the UE receives the MCCH information related to its interested MBMS service and checks whether the MBMS service has completed the MBMS Session Start procedure, if yes, then step 114 is performed, otherwise, step 111 is turned to be performed.

In step 114, the UE receives the corresponding DSI and receives the data of the interested MBMS service; and then the current flow ends.

In step 115, there is no MBMS service in which the UE is interested.

In step 116, the UE exits the MBMS application; and then the current flow ends.

Example 1

The UE obtains the ESG information in the manner of point to point, such as a manner of short message, before entering the MBSFN Area, and the ESG information includes all the MBMS services which may be bore in the network; and 15 MBMS services are taken for example in the present example. The ESG information further includes information about the MBSFN Area corresponding to each MBMS service, such as MBSFN Area ID, wherein the MBSFN Area ID is a multi-bit binary number. As shown in FIG. 7, MBSFN Area ID #a corresponds to MBMS service 1, MBSFN Area ID #b corresponds to MBMS service 2, and MBSFN Area ID #c corresponds to MBMS service 3.

The UE receives the system information block SIB13, the UE will acquire by the SIB13 that the cell is covered by two MBSFN Areas, which are the MBSFN Area corresponding to the MBSFN Area ID #a and the MBSFN Area corresponding to the MBSFN Area ID #b.

The cell service list information about that cell can be obtained by a coverage situation of the MBSFN Areas of that cell obtained according to the ESG information and SIB13, and the cell service list information is illustrated as shown in FIG. 7.

The UE selects an interested MBMS service from the cell service list.

The UE receives the information about the MCCH related to the interested MBMS service according to the interested MBMS service selected by the UE.

The UE judges whether its interested MBMS service has completed the MBMS Session Start procedure according to the obtained information about the MCCH; if that MBMS service has completed the MBMS Session Start procedure, it indicates that that MBMS service has been and is being sent by the network, and the MBMS service is in the ongoing state, then the UE will receive the service data of the MBMS service according to the control parameters of its interested MBMS service obtained from the MCCH; and if the control parameters of the MBMS service in which the UE is interested is not included, then the MBMS service does not trigger the MBMS Session Start procedure, it indicates that the MBMS service is not sent through the network currently, then the UE can acquire whether the corresponding MCCH has changed by monitoring the MCCH notification, and if it has changed, then the corresponding information about the MCCH will be re-updated, until its interested MBMS service has completed the MBMS Session Start procedure.

Example 2

Figure 8:
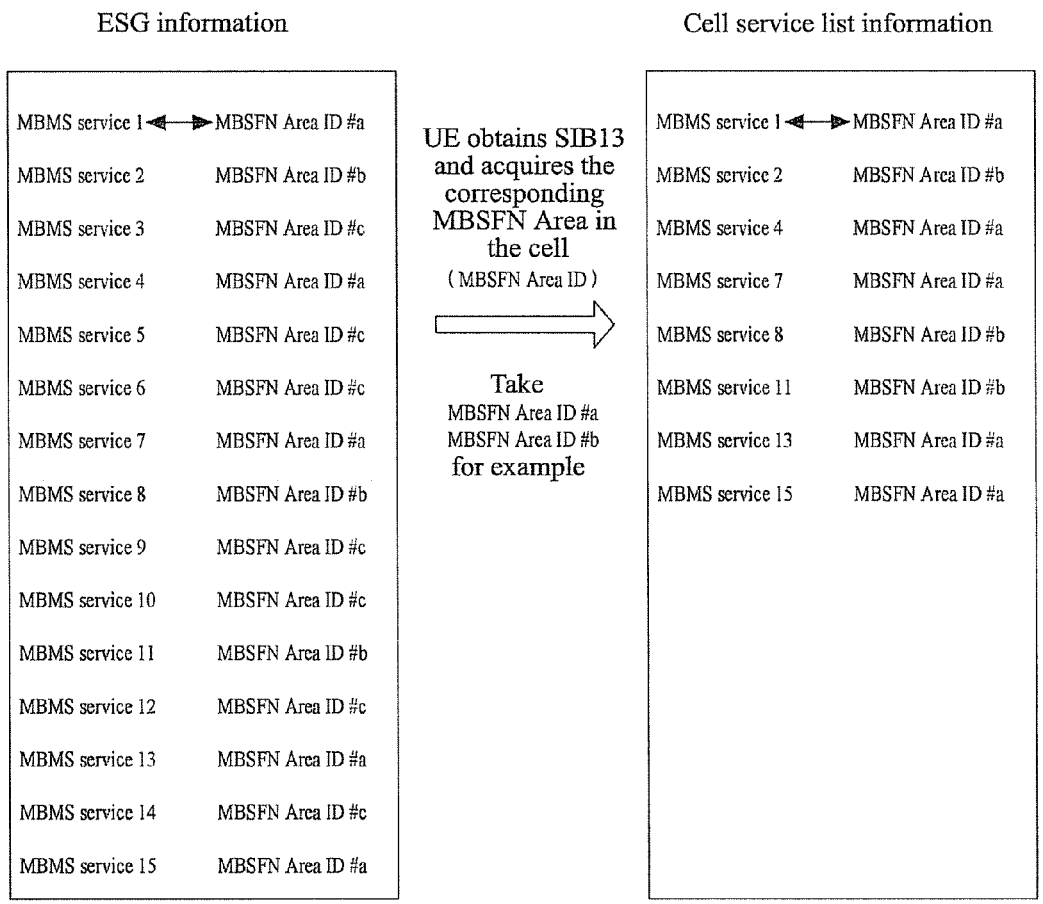
FIG. 8 is a schematic diagram of a UE obtaining cell service list information according to an example 2 of the present invention.

The UE obtains the ESG information in the manner of point to point, such as a manner of WAP, before entering the MBSFN Area, and the ESG information includes all the MBMS services which may be bore in the network; and 15 MBMS services are taken for example in the present embodiment. The ESG information further includes information about the MBSFN Area corresponding to each MBMS service, such as MBSFN Area ID, wherein the MBSFN Area ID is a multi-bit binary number. As shown in FIG. 8, MBSFN Area ID #a corresponds to MBMS service 1, MBSFN Area ID #b corresponds to MBMS service 2, and MBSFN Area ID #c corresponds to MBMS service 3.

The UE receives the system information block SIB13; the UE will acquire by the SIB13 that the cell is covered by two MBSFN Areas, which are the MBSFN Area corresponding to the MBSFN Area ID #a and the MBSFN Area corresponding to the MBSFN Area ID #b.

The cell service list information about that cell can be acquired by a coverage situation of the MBSFN Areas of that cell obtained according to the ESG information and SIB13, and the cell service list information is illustrated as shown in FIG. 8.

It needs to be pointed out here that: the UE receives the information about all the MCCHs of the corresponding cell according to the information about all the MBSFN Areas in that cell obtained from the SIB13, and selects its interested MBMS service from the acquired cell service list. Herein, it is different from example 1.

The UE receives the MCCH information related to the interested MBMS service according to the interested MBMS service selected by the UE.

The UE judges whether its interested MBMS service has completed the MBMS Session Start procedure according to the obtained information about the MCCH; if that MBMS service has completed the MBMS Session Start procedure, it indicates that that MBMS service has been and is being sent by the network, and the MBMS service is in the ongoing state, then the UE will receive the service data of the MBMS service according to the control parameters of its interested MBMS service obtained from the MCCH; and if the control parameters of the MBMS service in which the UE is interested is not included, then the MBMS service does not trigger the MBMS Session Start procedure, it indicates that the MBMS service is not sent through the network currently, then the UE can acquire whether the corresponding MCCH has changed by monitoring the MCCH notification, and if it has changed, then the corresponding information about the MCCH will be re-updated, until its interested MBMS service has completed the MBMS Session Start procedure.

Example 3

Figure 9:
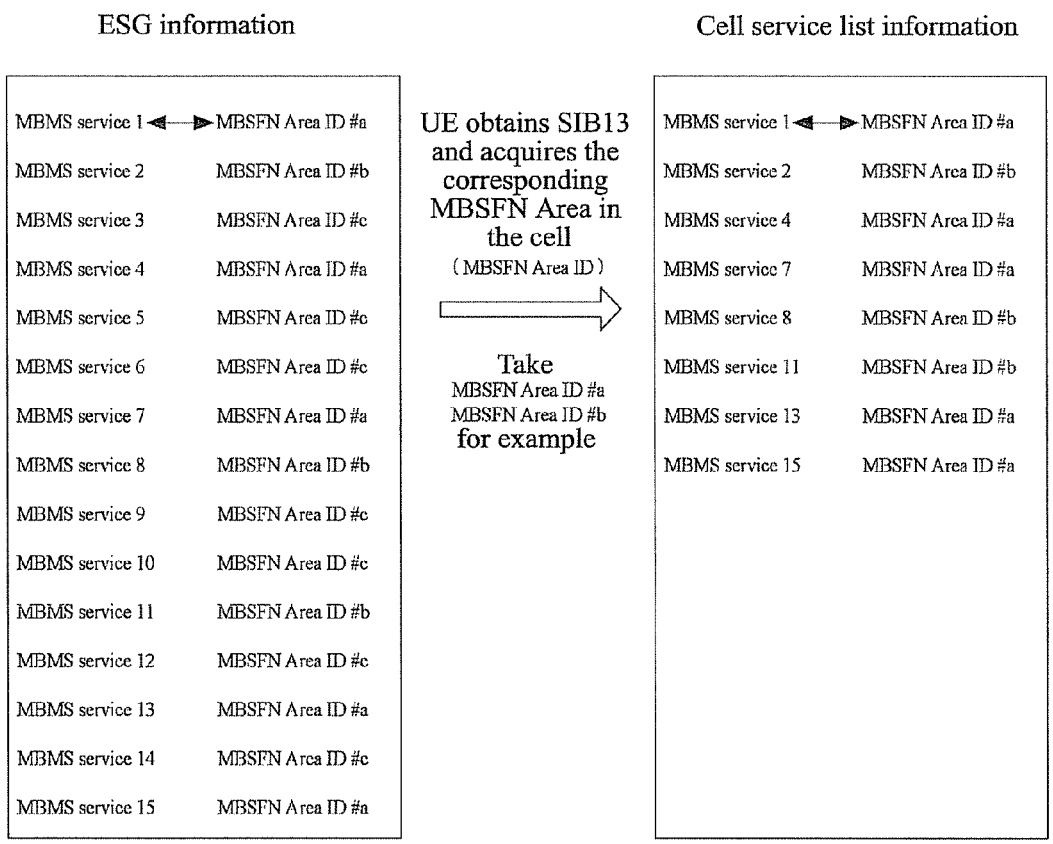
FIG. 9 is a schematic diagram of a UE obtaining cell service list information according to ab example 3 of the present invention.

The UE obtains the ESG information in the manner of point to point, such as a manner of WAP, before entering the MBSFN Area, and the ESG information includes all the MBMS services which may be bore in the network; and 15 MBMS services are taken for example in the present embodiment. The ESG information further includes information about the MBSFN Area corresponding to each MBMS service, such as MBSFN Area ID, wherein the MBSFN Area ID is a multi-bit binary number. As shown in FIG. 9, MBSFN Area ID #a corresponds to MBMS service 1, MBSFN Area ID #b corresponds to MBMS service 2, and MBSFN Area ID #c corresponds to MBMS service 3.

The UE receives the system information block SIB13; the UE will acquire by the SIB13 that the cell is covered by two MBSFN Areas, which are the MBSFN Area corresponding to the MBSFN Area ID #a and the MBSFN Area corresponding to the MBSFN Area ID #b.

The cell service list information about that cell can be acquired by a coverage situation of the MBSFN Areas of that cell obtained according to the ESG information and SIB13, and the cell service list information is illustrated as shown in FIG. 9.

The UE receives the information about all the MCCHs of the corresponding cell according to the information about all the MBSFN Areas in that cell obtained from the SIB13, and selects its interested MBMS service from the acquired cell service list.

It needs to be pointed out here: the UE receives the information about all the MCCHs in the cell indicated by the SIB13 according to the interested MBMS service selected by the UE, that is, it is not only to receive the information about the MCCH related to the MBMS service in which the UE is interested. Herein, it is different from example 2.

The UE judges whether its interested MBMS service has completed the MBMS Session Start procedure according to the obtained information about the MCCH; if that MBMS service has completed the MBMS Session Start procedure, it indicates that that MBMS service has been and is being sent by the network, and the MBMS service is in the ongoing state, then the UE will receive the service data of the MBMS service according to the control parameters of its interested MBMS service obtained from the MCCH; and if the control parameters of the MBMS service in which the UE is interested is not included, then the MBMS service does not trigger the MBMS Session Start procedure, it indicates that the MBMS service is not sent through the network currently, then the UE can acquire whether the corresponding MCCH has changed by monitoring the MCCH notification, and if it has changed, then the corresponding information about the MCCH will be re-updated, until its interested MBMS service has completed the MBMS Session Start procedure.

A system for obtaining a service list and data of MBMS service comprises: a cell service list acquisition unit, configured to obtain ESG information, receive an SIB13 from system information, and obtain a cell service list according to the ESG information and the SIB13.

Herein, the cell service list acquisition unit is further configured for the UE to acquire information about one or more MBSFN Areas of a cell to which the UE belongs by the SIB13, obtain one or more MBSFN Area IDs from the information about one or more MBSFN Areas, select a part of or all of MBMS services from the MBMS services obtained by the ESG information, compose the cell service list using the selected MBMS services, so as to achieve the acquisition of the cell service list. Wherein, the selecting specifically comprises: being achieved by matching according to a one-to-one correspondence relation between an MBMS service ID and an MBSFN Area ID in the ESG information and an MBSFN Area ID obtained from the SIB13.

Herein, the system further comprises: an MBMS service selection unit, a control information acquisition unit and an MBMS service data acquisition unit. The MBMS service selection unit is configured for the UE to select an MBMS service in which the UE is interested from the cell service list. The control information acquisition unit is configured for the UE to obtain control information related to the MBMS service in which the UE is interested. The MBMS service data acquisition unit is configured for the UE to receive data of the MBMS service in which the UE is interested according to the control information.

Here, the MBMS service selection unit is further configured for the UE to directly select the MBMS service in which the UE is interested from the cell service list; or for the UE to select the MBMS service in which the UE is interested from the cell service list after receiving information about one or more corresponding MCCHs by the information about one or more MBSFN Areas obtained from the SIB13. Wherein, for the information about one or more MCCHs and one or more MBSFN Areas, there is a one-to-one correspondence relation between the information about each MCCH and the MBSFN Area ID corresponding to each MBSFN Area.

Herein, the control information acquisition unit is further configured for the UE to obtain the information about the MCCH corresponding to the MBMS service in which the UE is interested according to the one-to-one correspondence relation between the information about the MCCH and the MBMS service ID; wherein, acquiring the one-to-one correspondence relation between the information about the MCCH and the MBMS service ID specifically comprises: the UE acquiring the one-to-one correspondence relation between the information about the MCCH and the MBMS service ID according to the one-to-one correspondence relation between the information about each MCCH and the MBSFN Area ID and the one-to-one correspondence relation between each MBSFN Area ID and the MBMS service ID.

Here, the Chinese and English annotations of the above mentioned text and text in the drawings are described as follows:

overlapping coverage can be represented as overlapping, modification period can be represented as Modification Period, MP for short, the repeat period can be represented as Repeat Period, RP for short, the system information block can be represented as System Information Block, SIB for short, uniform can be represented as common, and payload can be represented as payload.

What is described above is merely preferred embodiments of the present invention, and is not intended to limit the protection scope of the present invention.

What we claim is:

1. A method for acquiring a service list and multimedia broadcast multicast service data, comprising:
   acquiring electronic service guide (ESG) information, wherein, the ESG information comprises at least one of the following information: all multimedia broadcast multicast service (MBMS) services carried in a network side, and information about the multimedia broadcast multicast single frequency network (MBSFN) Area corresponding to each MBMS service;
   reading a system information block (SIB)13 from a system broadcast message;
   acquiring a cell service list according to a matching between the ESG information and the SIB13; and
   acquiring corresponding multimedia broadcast multicast service data based on the specific information about the MBSFN Area corresponding to a user selected MBMS service form the cell service list.

2. The method according to claim 1, wherein, when a user equipment (UE) acquires the ESG information, an acquisition opportunity of the ESG information comprises: when the UE just starts up, or when the UE is registering to a network side, or before the UE enters a current multimedia broadcast multicast service single frequency network (MBSFN) area, or before the UE enters another MBSFN area besides the current MBSFN area.

3. The method according to claim 1, wherein, there is a one-to-one correspondence relation between each MBMS service and the MBSFN Area.

4. The method according to claim 1, wherein, the information about the MBSFN Area at least comprises: MBSFN Area identity (ID), and the MBSFN Area ID is one-to-one correspondence to an MBMS service ID; wherein, each MBSFN Area is identified by the corresponding MBSFN Area ID, and each MBMS service is identified by the corresponding MBMS service ID; and acquiring the cell service list according to the ESG information and the SIB 13 comprises: the UE learning the information about one or more MBSFN Areas of a cell to which the UE belongs by the SIB13, acquiring one or more MBSFN Area IDs from the information, selecting a part of or all of the MBMS services from the MBMS services acquired by the ESG information, composing the cell service list using the selected MBMS services, so as to achieve the acquisition of the cell service list; wherein, the selecting comprises: being achieved by matching according to the one-to-one correspondence relation between the MBMS service ID and the MBSFN Area ID in the ESG information and the MBSFN Area ID acquired from the SIB13.

5. The method according to claim 4, after acquiring the cell service list, further comprising: the UE selecting an MBMS service in which the UE is interested from the cell service list; the UE acquiring control info nation related to the MBMS service in which the UE is interested; and the UE receiving data of the MBMS service in which the UE is interested according to the control information.

6. The method according to claim 5, wherein, selecting the MBMS service in which the UE is interested comprises:

the UE directly selecting the MBMS service in which the UE is interested from the cell service list;

or, after reading the information about one or more corresponding multicast control channels (MCCH) through the information about one or more MBSFN Areas acquired from the SIB13, the UE selecting the MBMS service in which the UE is interested from the cell service list; wherein, for the information about one or more MCCHs and one or more MBSFN Areas, there is a one-to-one correspondence relation between the information about each MCCH and the MBSFN Area ID corresponding to each MBSFN Area.

7. The method according to claim 6, wherein, acquiring the control information related to the MBMS service in which the UE is interested comprises: the UE acquiring the information about the MCCH corresponding to the MBMS service in which the UE is interested according to the one-to-one correspondence relation between the information about the MCCH and the MBMS service ID;

wherein, learning the one-to-one correspondence relation between the information about the MCCH and the MBMS service ID comprises: the UE learning the one-to-one correspondence relation between the information about the MCCH and the MBMS service ID according to the one-to-one correspondence relation between the information about each MCCH and the MBSFN Area ID and the one-to-one correspondence relation between each MBSFN Area ID and the MBMS service ID.

8. A system for acquiring a service list and multimedia broadcast multicast service data, comprising: a cell service list acquisition unit, configured to acquire electronic service guide (ESG) information; wherein, the ESG information comprises at least one of the following information: all multimedia broadcast multicast service (MBMS) services carried in a network side, and information about the multimedia broadcast multicast single frequency network (MBSFN) Area corresponding to each MBMS service;

read a system information block (SIB)13 from a system broadcast message;

acquire a cell service list according to a matching between the ESG information and the SIB13; and acquire corresponding multimedia broadcast multicast service data based on the specific information about the MBSFN Area corresponding to a user selected MBMS service from the cell service list.

9. The system according to claim 8, wherein, the cell service list acquisition unit is further configured for the UE to learn information about one or more multimedia broadcast multicast service single frequency network (MBSFN) Areas of a cell to which the UE belongs by the SIB13, acquire one or more MBSFN Area IDs from the information, select a part of or all of MBMS services from the MBMS services acquired by the ESG information, compose the cell service list using the selected MBMS services, so as to achieve the acquisition of the cell service list; wherein, the selecting comprises: being achieved by matching according to a one-to-one correspondence relation between an MBMS service ID and an MBSFN Area ID in the ESG information and an MBSFN Area ID acquired from the SIB13.

10. The system according to claim 9, further comprising: an MBMS service selection unit, a control information acquisition unit and an MBMS service data acquisition unit; wherein, the MBMS service selection unit is configured for the UE to select an MBMS service in which the UE is interested from the cell service list;

the control information acquisition unit is configured for the UE to acquire control information related to the MBMS service in which the UE is interested; and the MBMS service data acquisition unit is configured for the UE to receive data of the MBMS service in which the UE is interested according to the control information.

11. The system according to claim 10, wherein, the MBMS service selection unit is further configured for the UE to directly select the MBMS service in which the UE is interested from the cell service list, or for the UE to select the MBMS service in which the UE is interested from the cell service list after reading information about one or more corresponding multicast control channels (MCCHs) by the information about one or more MBSFN Areas acquired from the SIB13; and wherein, for the information about one or more MCCHs and one or more MBSFN Areas, there is a one-to-one correspondence relation between the information about each MCCH and the MBSFN Area ID corresponding to each MBSFN Area.

12. The system according to claim 11, wherein, the control information acquisition unit is further configured for the UE to acquire the information about the MCCH corresponding to the MBMS service in which the UE is interested according to the one-to-one correspondence relation between the information about the MCCH and the MBMS service ID; wherein, learning the one-to-one correspondence relation between the information about the MCCH and the MBMS service ID comprises: the UE learning the one-to-one correspondence relation between the information about the MCCH and the MBMS service ID according to the one-to-one correspondence relation between the information about each MCCH and the MBSFN Area ID and the one-to-one correspondence relation between each MBSFN Area ID and the MBMS service ID.

13. The method according to claim 2, wherein, the information about the MBSFN Area at least comprises: MBSFN Area identity (ID), and the MBSFN Area ID is one-to-one correspondence to an MBMS service ID; wherein, each MBSFN Area is identified by the corresponding MBSFN Area ID, and each MBMS service is identified by the corresponding MBMS service ID; and acquiring the cell service list according to the ESG information and the SIB13 comprises: the UE learning the information about one or more MBSFN Areas of a cell to which the UE belongs by the SIB13, acquiring one or more MBSFN Area IDs from the information, selecting a part of or all of the MBMS services from the MBMS services acquired by the ESG information, composing the cell service list using the selected MBMS services, so as to achieve the acquisition of the cell service list; wherein, the selecting comprises: being achieved by matching according to the one-to-one correspondence relation between the MBMS service ID and the MBSFN Area ID in the ESG information and the MBSFN Area ID acquired from the SIB13.

14. The method according to claim 13, after acquiring the cell service list, further comprising: the UE selecting an MBMS service in which the UE is interested from the cell service list; the UE acquiring control information related to the MBMS service in which the UE is interested; and the UE receiving data of the MBMS service in which the UE is interested according to the control information.

15. The method according to claim 14, wherein, selecting the MBMS service in which the UE is interested comprises:
the UE directly selecting the MBMS service in which the UE is interested from the cell service list;
or, after reading the information about one or more corresponding multicast control channels (MCCH) through the information about one or more MBSFN Areas acquired from the SIB13, the UE selecting the MBMS service in which the UE is interested from the cell service list; wherein, for the information about one or more MCCHs and one or more MBSFN Areas, there is a one-to-one correspondence relation between the information about each MCCH and the MBSFN Area ID corresponding to each MBSFN Area.

16. The method according to claim 15, wherein, acquiring the control information related to the MBMS service in which the UE is interested comprises: the UE acquiring the information about the MCCH corresponding to the MBMS service in which the UE is interested according to the one-to-one correspondence relation between the information about the MCCH and the MBMS service ID;

wherein, learning the one-to-one correspondence relation between the information about the MCCH and the MBMS service ID comprises: the UE learning the one-to-one correspondence relation between the information about the MCCH and the MBMS service ID according to the one-to-one correspondence relation between the information about each MCCH and the MBSFN Area ID and the one-to-one correspondence relation between each MBSFN Area ID and the MBMS service ID.

17. The method according to claim 1, wherein, the information about the MBSFN Area at least comprises: MBSFN Area identity (ID), and the MBSFN Area ID is one-to-one correspondence to an MBMS service ID; wherein, each MBSFN Area is identified by the corresponding MBSFN Area ID, and each MBMS service is identified by the corresponding MBMS service ID; and acquiring the cell service list according to the ESG information and the SIB 13 comprises: the UE learning the information about one or more MBSFN Areas of a cell to which the UE belongs by the SIB13, acquiring one or more MBSFN Area IDs from the information, selecting a part of or all of the MBMS services from the MBMS services acquired by the ESG information, composing the cell service list using the selected MBMS services, so as to achieve the acquisition of the cell service list; wherein, the selecting comprises: being achieved by matching according to the one-to-one correspondence relation between the MBMS service ID and the MBSFN Area ID in the ESG information and the MBSFN Area ID acquired from the SIB13.

18. The method according to claim 17, after acquiring the cell service list, further comprising: the UE selecting an MBMS service in which the UE is interested from the cell service list; the UE acquiring control information related to the MBMS service in which the UE is interested; and the UE receiving data of the MBMS service in which the UE is interested according to the control information.

19. The method according to claim 3, wherein, the information about the MBSFN Area at least comprises: MBSFN Area identity (ID), and the MBSFN Area ID is one-to-one correspondence to an MBMS service ID; wherein, each MBSFN Area is identified by the corresponding MBSFN Area ID, and each MBMS service is identified by the corresponding MBMS service ID; and acquiring the cell service list according to the ESG information and the SIB13 comprises: the UE learning the information about one or more MBSFN Areas of a cell to which the UE belongs by the SIB13, acquiring one or more MBSFN Area IDs from the information, selecting a part of or all of the MBMS services from the MBMS services acquired by the ESG information, composing the cell service list using the selected MBMS services, so as to achieve the acquisition of the cell service list; wherein, the selecting comprises: being achieved by matching according to the one-to-one correspondence relation between the MBMS service ID and the MBSFN Area ID in the ESG information and the MBSFN Area ID acquired from the SIB13.

* * * * *